US006596829B1

(12) United States Patent
Peavy

(10) Patent No.: US 6,596,829 B1
(45) Date of Patent: Jul. 22, 2003

(54) FLUOROPOLYMERS AND PROCESSES THEREFOR AND THEREWITH

(75) Inventor: Richard Edwin Peavy, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/059,924

(22) Filed: Jan. 29, 2002

(51) Int. Cl.$^7$ ............................................. C08F 114/18
(52) U.S. Cl. ...................... 526/250; 526/253; 526/206; 526/247; 526/255
(58) Field of Search ................................ 526/250, 253, 526/255, 206, 247

(56) References Cited

U.S. PATENT DOCUMENTS

| 5,310,870 A | | 5/1994 | Peavy |
| 5,459,212 A | * | 10/1995 | Krespan et al. ............... 526/89 |
| 5,476,603 A | | 12/1995 | Buchwald et al. |
| 5,552,500 A | | 9/1996 | Peavy |
| 5,665,838 A | | 9/1997 | Peavy |
| 5,789,504 A | | 8/1998 | Ihara et al. |

FOREIGN PATENT DOCUMENTS

| JP | 6-157614 A | 6/1994 |
| JP | 10-158335 A | 1/1998 |
| WO | WO 98/51649 A | 1/1998 |

* cited by examiner

*Primary Examiner*—David W. Wu
*Assistant Examiner*—Henry S. Hu

(57) ABSTRACT

A composition that can be used as, for example, mold release agent or lubricant and is disclosed. The composition comprises a fluorotelomer, which comprises repeat units derived from a fluoroalkene, and optionally a comonomer, and has an end group derived from a secondary alcohol or derivative thereof. Also disclosed is a process that can be used to produce the fluorotelomer. The process comprises contacting a fluoroalkene in a hydrofluorocarbon with at least one secondary alcohol, ether or ester thereof, or combinations of two or more thereof wherein the secondary is substantially soluble in the hydrofluorocarbon.

22 Claims, No Drawings

FLUOROPOLYMERS AND PROCESSES THEREFOR AND THEREWITH

FIELD OF THE INVENTION

This invention relates to a class of fluorotelomers end-capped with secondary alcohols or their ethers or esters, to a process for producing the polymer, and to a process for using the polymer as insoluble, chemically and thermally stable lubricants, mold release agents, polishes, and coatings.

BACKGROUND OF THE INVENTION

Wax-like fluorotelomers are disclosed in U.S. Pat. No. 3,067,262. Such fluorotelomers were based predominately on a fluorotelomer backbone of polytetrafluoroethylene (PTFE) formed by telomerization of tetrafluoroethylene (TFE) in 1,1,2,-trichloro-1,2,2-trifluoroethane (TCTFE) in the presence of a peroxide free-radical initiator wherein the TCTFE served both as a solvent and as a telogen. Telomerization can be defined as a reaction between two substances in which one substance provides the terminal groups (telogen) and the other provides the internal linkages of the telomer.

U.S. Pat. No. 5,552,500 and U.S. Pat. No. 5,665,838 disclose a process for producing a fluorotelomer in which a hydrochlorofluorocarbon is used both as telogen and solvent. The fluorotelomers, dispersed in 1,1-dichloro-1-fluoroethane (HCFC-141b), have been used commercially as dry film lubricants, and sold by E. I. du Pont de Nemours & Co. under the trademarks DryFilm DF and DryFilm 1000.

An international agreement in the 1980's banned most uses for chlorofluorocarbons such as TCTFE and minimized over time the uses of hydrochlorofluorocarbons (HCFC) such as HCFC-141b, because of their threat to the ozone layer in the upper atmosphere and their involvement in global warming. U.S. Pat. No. 5,310,870 discloses a process for producing a fluorotelomer by reacting TFE or hexafluoropropylene with a hydrofluorocarbon telogen in solution, in the presence of a free radical initiator. This hydrofluorocarbon telogen consists essentially of an acyclic organic compound having a boiling point at atmospheric pressure between 25° C. and 150° C.

Many industrial operations require the use of release agents to reduce the tendency of a molded product to stick to the mold, or that of a tool to stick to the object on which it is working. In some cases, where a typical lubricant would be unsatisfactory or unsightly, e.g., a window frame, a release agent may also be used as a dry film lubricant to make it easier for a movable part to slide on a stationary piece of equipment. Release agents may be a solution, dispersion or solid, and typically form a thin, generally invisible film on one or both of the above touching objects.

For example, Japanese Kokai JP6-157614A discloses a polymerization process using 2,3-dihydro-decafluoropentane as polymerization medium; JP10-158335A discloses a fluoropolymer containing a hydroxyl group having a fluorine content of 20 weight % or more and a molecular weight of 500–1,000; U.S. Pat. No. 5,789,504 discloses a process for producing a low molecular weight polytetrafluoroethylene having a melting point of 250° C.–325° C.; and EP 0723979A1 discloses a comparable process wherein the solvent is selected from a group that also includes hydrofluorocarbons. However, these patents and applications do not disclose a process or composition for use as release agents or lubricants.

WO 98/51649 discloses a fluorinated saturated hydrocarbon containing 10%–95% of a trihydrofluorocarbon and useful as a solvent or forming a polymer coating to promote cleaning, lubrication or repellency on surfaces. Also U.S. Pat. No. 5,476,603 discloses a composition which is liquefied under pressure, and comprises certain non-polymeric hydrofluorocarbons and an agent having a releasing action selected from the group of certain waxy esters having 34 to 50 carbon atoms, a paraffin wax, a polyethylene wax and a metal soap.

There is a constant need for providing an improved release agents and lubricants that are environmentally friendly, i.e., not based on chlorine-containing fluorocarbons.

SUMMARY OF THE INVENTION

A composition, which can be used as, for example, mold release agent or lubricant, comprises a fluorotelomer comprising repeat units derived from a fluoroalkene, and optionally a comonomer, having an end group derived from a secondary alcohol or derivative thereof.

A process comprises contacting a fluoroalkene, and optionally a comonomer, in a hydrofluorocarbon, with a free radical initiator and at least one secondary alcohol or derivative thereof.

DETAILS OF THE INVENTION

The composition comprising a fluorotelomer can be used as mold release agent. For example, a dispersion of the fluorotelomer in a solvent or water, when applied to a mold and solvent allowed to evaporate, provides a coating that affords multiple releases of an article from the mold. The coating can be used at temperatures ranging from ambient to over 300° C.

The composition can also be used as lubricant. For example, a coating of the fluorotelomer applied to a surface will provide a very lubricious coating with a low coefficient of friction. The surface can be a mold or other object made of wood, metal, plastic, rubber, stone, cement, glass, or fiber. These surfaces are well known to one skilled in the art.

Any fluoroalkene that can produce a fluorotelomer having the property disclosed herein can be used. The preferred fluoroalkene monomer contains 2 to about 10, preferably 2 to 3, carbon atoms. Examples of suitable fluoroalkenes include, but are not limited to, 1,1-difluoroethylene, 1,2-difluoroethylene, tetrafluoroethylene (TFE), 3,3,3-trifluoropropene, hexafluoropropylene (HFP), and combinations of two or more thereof. The most preferred fluoroalkene is TFE.

The preferred fluorotelomers are homotelomers, but a cotelomer (copolymer) containing repeat unit derived from a comonomer can also be produced. The comonomer is generally an ethylenically unsaturated compound, which can be fluorinated or perfluorinated. The amount of repeat units derived from a comonomer can be in the range of from about 0.1 to about 10, preferably 0.3 to 3.0 weight % of the copolymer.

Suitable comonomers include, but are not limited to, ethylene, propylene, butylene, decene, 1,1-difluoroethylene, 1,2-difluoroethylene, TFE, 3,3,3-trifluoropropene, HFP, and combinations of two or more thereof. The preferred comonomers are perfluorinated comonomers. The most preferred comonomer is TFE, HFP, or combinations thereof.

As disclosed below, a hydrofluorocarbon is used in a process for producing the fluorotelomer of the composition, a hydrofluorocarbon can also be incorporated into the fluorotelomer as an end group. The suitable hydrofluorocarbons include, but are not limited to, any of those disclosed in U.S. Pat. No. 5,310,870, the disclosure of which is incorporated herein by reference. Examples of suitable hydrofluorcarbons include, but are not limited to, 2,3-dihydrodecafluoropentane, perfluorobutyl methyl ether, perfluorobutyl ethyl ether, 2,4-dihydrooctafluorobutane, 1,1,2,3,3,3-hexafluoropropyl methy ether, 2-trifluoromethyl-2,3-dihydrononafluoropentane, 1,1,1,3,3-pentafluorobutane, or combinations thereof. These hydrofluorocarbons can be obtained commercially. For example, 2,3-dihydrodecafluoropentane is available from E. I. DuPont de Nemours & Co., Wilmington, Del. and perfluorobutyl methyl ether and perfluorobutyl ethyl ether are available from 3M Co., Minneapolis, Minn.

Generally, majority of the end group of the fluorotelomer can be derived from any secondary alcohol or derivative thereof. A suitable secondary alcohol or derivative thereof is the one that is substantially soluble in a hydrofluorocarbon disclosed herein. The most preferred secondary alcohols are those having at least 4 to about 12 carbon atoms and an α-hydrogen. The end group can also be derived from a derivative of a secondary alcohol. The derivative of suitable secondary alcohol can include an ether or ester of a secondary alcohol or combinations thereof. Also suitable is the combinations of a secondary alcohol, ether thereof, and/or ester thereof. Examples of suitable secondary alcohols include, but are not limited to, 2-propanol, 2-butanol, 2-pentanol, 2-hexanol, 2-heptanol, sec-butyl acetate, cyclohexanol, 1-methoxy-2-propanol, 1-methoxy-3-butanol, 1-methoxy-2-pentanol, 1-methoxy-2-propanol acetate ester, and combinations of two or more thereof. Most preferred is 2-butanol, 2-pentanol, or combinations thereof.

The molar ratio of the repeat units derived from the fluoroalkene to the secondary alcohol or its derivative can be in the range of from about 18:1 to about 500:1, preferably about 120:1 to about 150:1. The molar ratio of the repeat units derived from the fluoroalkene to the hydrofluorocarbon can be in the range of from about 800:1 to about 2500:1, preferably about 2000:1 to about 2400:1.

As disclosed below, a free radical initiator is generally used in producing the fluorotelomer. Generally, a minor amount of the free radical initiator can also be incorporated into the fluorotelomer. The amount incorporated generally is about the same as, or lower than, that of the hydrofluorocarbon.

The fluorotelomer can have or comprise a structure depicted as either $H(CX_2)_pB_qD_r$ or a mixture of $H(CX_2)_pB_q$ and $H(CX_2)_pD_r$. In the formulae, X is H or F in which preferably ≧80%, more preferably ≧90%, and most preferably ≧99% is F; p is a number from about 36 to about 1500, preferred 60 to 600; B denotes any repeat units derived from a hydrofluorocarbon; q is a number from 0.02 to 0.4, D represents the end group derived from a secondary alcohol; and r is a number from 0.2 to 1.0.

According to the second embodiment of the invention, a process that can be used to produce a fluorotelomer, such as the one disclosed above, is provided. The process comprises, consists essentially of, or consists of, a fluoroalkene, and optionally a comonomer, in a hydrofluorocarbon as solvent, with a free radical initiator and at least one secondary alcohol or derivative thereof.

The fluortelomer that can be produced is the same as that disclosed above. The hydrofluorocarbon, secondary alcohol or derivative thereof, and comonomer are the same as those disclosed above.

Essentially any free radical initiator can initiate reaction to produce the fluorotelomers of this invention in the presence of a hydrofluorocarbon, fluoroalkene, and secondary alcohol. Preferred free radical initiators are di-tertiary butyl peroxide, tertiary-butyl perbenzoate, tert-amyl 2-ethyl hexanoate, and azo initiators such as 1,1-azobis (cyanocyclohexane) and most preferred is di-tertiary butyl peroxide. The amount of free radical initiator used preferably falls within the range of 0.4 to 3.0, more preferably 0.7 to 2.5, weight %, base on the weight of the fluoroalkene.

The amount of secondary alcohol can be that which produces a fluorotelomer with a number average molecular weight in the range of from about 1,800 to 75,000, preferably 3,000 to 30,000. For example, the amount of secondary alcohol can be between about 0.1 to about 5, preferably about 0.3 and about 5, and preferably 2.5 to 4.0 mole %, based on the total number of moles of fluoroalkene.

The fluorotelomer having an end group derived from a secondary alcohol or derivative thereof can allow the fluorotelomer for crosslinking with a crosslinking agent. Suitable crosslinking agent include a tetraalkyl titanate having the formula of $M(OR)_4$ where M is titanium or zirconium and each R is independently an alkyl radical, a cycloalkyl radical, an aralkyl hydrocarbon radical, and combinations of two or more thereof in which each radical can contain, preferably, 2 to 12 carbon atoms per radical and each R can be the same or different. Suitable tetraalkyl titanates include, but are not limited to, tetraethyl titanate, tetrapropyl titanate, tetraisopropyl titanate, tetra-n-butyl titanate, tetra-2-ethyl titanate, tetraoctyl titanate, tetraethyl zirconate, tetrapropyl zirconate, tetraisopropyl zirconate, tetra-n-butyl zirconate, tetra-2-ethyl zirconate, tetraoctyl zirconate, and combinations of any two or more thereof. The preferred crosslinking agents include, but are not limited to, TYZOR® TPT and TYZOR® TBT (tetraisopropyl titanate and tetra n-butyl titanate, respectively) available from E. I. du Pont de Nemours and Company, Wilmington, Del. Crosslinked fluorotelomers generally have enhanced bonding, compared with those non-crosslinked ones, to the surface of a substrate, which can be made of wood, metal, plastic, rubber, stone, cement, glass, fiber, and combinations of two or more thereof.

The process, a telomerization, can be carried out at temperatures in the range of about 100° C. to about 200° C., preferably about 110° C. to about 180° C., and most preferably 120° C. to 160° C. at autogenous pressures. The pressure can range from about 100 to about 700 psig, preferably about 400 to about 600 psig, and most preferably about 500 psig. The preferred time period is about 1–6 hours, though it can be shorter or longer than this range. In a continuous flow reactor the reaction can proceed for about 1–2 hours. A batch process can be preferably carried out at an autogenous pressure with temperatures in the range of about 125° C. to about 160° C. for about 4–6 hours. The molar ratio of hydrofluorocarbon to fluoroalkene can be in the range of from about 1:1 to about 10:1, preferably 2:1 to 8:1. Generally the higher the ratio, the lower the telomer molecular weight.

After the telomerization process, the fluorotelomer is generally recovered as dispersion in the hydrofluorocarbon. The dispersion can contain from about 5–20 weight % of the fluorotelomer, with dispersions of high molecular weight fluorotelomers falling at the low end of this range. If desired, the fluorotelomers can also be exchanged into other solvents such as isopropanol or in water as well.

The composition, which can be the fluorotelomer disclosed herein, can be contacted with the surface of a substrate disclosed above for use as polishes, coatings, mold release agents, or lubricants. The contacting can be carried out by any means known to one skilled in the art such as, for example, spraying, dipping, wiping, brushing, or combinations of two or more thereof. Because these means are well known, description of which is omitted in the interest of brevity.

EXAMPLES

The following general procedure was used in preparing the fluorotelomers referred to in the examples that follow this discussion.

Polymer Syntheses

Example 1

A solution of 19.5 g di-tert-butyl peroxide, 23.5 g 2-pentanol and 8,957 g 2,3-dihydrodecafluoropentane was prepared in a 5 gallon plastic container. The solution was mixed, and 1500 g of the solution were placed in a one liter electrically heated stainless steel autoclave fitted with internal cooling coils and an agitator. The remainder of the catalyst solution was placed in a 2-gallon container attached to a Beckman feed pump.

The autoclave was sealed, the agitator started at 1,000 rpm, and the contents were then heated to 150° C. using the electric heating coils. Pressure in the autoclave was regulated by means of a back-pressure control valve set at 500 psi. When the autoclave contents reached 145° C., feed of catalyst solution was initiated with the Beckman pump at a feed rate of 17.6 g/min. When the temperature in the autoclave reached 148° C., tetrafluoroethylene (TFE) was fed into the reactor at a feed rate of 1.75 g/min using a diaphragm compressor pump. TFE and catalyst solution were fed simultaneously for the duration of the run, with controlling parameters as follows:

| Temperature: | 150 ± 2° C. |
|---|---|
| Pressure: | 500 ± 20 psi |
| Catalyst solution: | 17.6 g/min |
| TFE: | 1.75 g/min |
| Agitation: | 1,000 rpm |

As catalyst and TFE were fed to the reactor, the product dispersion was continuously removed from the top of the reactor through the back-pressure control valve and collected in 16 oz. bottles. The thick, white dispersion of PTFE in dihydrodecafluoropentane averaged 8.10% solids. Conversion of TFE to polymer was 82% of theory. The resulting polymer had a melting point of 285.7° C. as determined by differential scanning calorimetry (DSC).

Example 2

A solution of 13.0 g di-tert-butyl peroxide, 19.8 g 2-butanol and 8,967 g dihydrodecafluoropentane was prepared as in Example 1 and 1500 g placed in the 1 liter autoclave as above. The remainder was placed in the 2-gallon reservoir feeding the Beckman pump.

Autoclave was sealed as before and the contents heated to 150° C. Essentially the same procedure and conditions as Example 1 were conducted in Example 2. Product was again a thick, white dispersion, with an average solids content of 7.80%. Conversion of TFE to polymer was 84% of theory. The resulting polymer had a melting point of 288.4° C. by DSC.

Example 3

A solution of 31.1 g di-tert-butyl peroxide, 42.0 g 2-butanol and 8,927 g dihydrodecafluoropentane was prepared in the same manner as above and the solution placed in the autoclave and feed reservoir as in Example 1.

The autoclave was heated to 150° C. and catalyst solution feed started at 17.6 g/min once the temperature reached 145° C. At 148° C., TFE feed was initiated at a rate of 2.80 g/min. Simultaneous feeds were continued at these rates for the duration of the run. Temperatures and pressures were maintained as in the previous examples. The resulting creamy white dispersion contained 11.2% polymer solids. Conversion of TFE to polymer was 84% of theory. The polymer had a melting point of 265.5° C. by DSC.

Example 4

A solution of 19.5 g di-tert-butyl peroxide, 31.1 g cyclohexanol and 8,949 g dihydrodecafluoropentane was prepared in the same manner as above and the solution placed in the autoclave and feed reservoir as above.

Autoclave was heated to 150° C. and catalyst solution feed started at 17.6 g/min once the temperature reached 145° C. At 148° C., TFE feed was initiated at a rate of 1.75 g/min. Simultaneous feeds were continued at these rates for the duration of the run. Temperatures and pressures were maintained as in the previous examples. The resulting creamy white dispersion contained 7.3% polymer solids. Conversion of TFE to polymer was 75% of theory. The polymer had a melting point of 273° C. by DSC.

Example 5

A solution of 19.5 g di-tert-butyl peroxide, 32.0 g 1-methoxy-2-propanol and 8,948 g dihydrodecafluoropentane was prepared in the same manner as above and the solution placed in the autoclave and feed reservoir as above.

Autoclave was heated to 150° C. and catalyst solution feed started at 17.6 g/min once the temperature reached 145° C. At 148° C., TFE feed was initiated at a rate of 1.75 g/min. Simultaneous feeds were continued at these rates for the duration of the run. Temperatures and pressures were maintained as in the previous examples. The resulting creamy white dispersion contained 7.9% polymer solids. Conversion of TFE to polymer was 84% of theory. The polymer had a melting point of 266.5° C. by DSC.

Example 6

A solution of 19.5 g di-tert-butyl peroxide, 21.4 g 2-propanol and 8,959 g dihydrodecafluoropentane was prepared in the same manner as above and the solution placed in the autoclave and feed reservoir as above.

The autoclave was heated to 150° C. and catalyst solution feed started at 17.6 g/min once the temperature reached 145° C. At 148° C., TFE feed was initiated at a rate of 1.75 g/min. Simultaneous feeds were continued at these rates for the duration of the run. Temperatures and pressures were maintained as in the previous examples. The resulting creamy white dispersion contained 8.5% polymer solids. Conversion of TFE to polymer was 89% of theory. The polymer had a melting point of 270.7° C. by DSC.

Example 7

A solution of 19.5 g di-tert-butyl peroxide, 46.9 g propylene glycol methyl ether acetate and 8,934 g dihydrodecafluoropentane was prepared in the same manner as above and the solution placed in the autoclave and feed reservoir as above.

The autoclave was heated to 150° C. and catalyst solution feed started at 17.6 g/min once the temperature reached 145° C. At 148° C., TFE feed was initiated at a rate of 1.75 g/min. Simultaneous feeds were continued at these rates for the duration of the run. Temperatures and pressures were maintained as in the previous examples. The resulting creamy white dispersion contained 7.9% polymer solids. Conversion of TFE to polymer was 91% of theory. The polymer had a melting point of 272.6° C. by DSC.

Example 8

A solution of 18.3 g tert-amyl peroxy-2-ethylhexanoate, 23.5 g 2-butanol and 8,958 g methyl nonafluorobutyl ether was prepared in the same manner as previously and the solution placed in the autoclave and feed reservoir as above.

The autoclave was heated to 115° C. and catalyst solution feed started at 16.9 g/min once the temperature reached 110C. At 113° C., TFE feed was initiated at a rate of 1.50 g/min. Simultaneous feeds were continued at these rates for the duration of the run. Temperature was maintained at 115° C. and pressure was maintained at 500 psi. The resulting creamy white dispersion contained 5.8% polymer solids. Conversion of TFE to polymer was 69% of theory. The polymer had a melting point of 274° C. by DSC.

Example 9

A solution of 11.6 g di-tert-butyl peroxide, 14.3 g 2-propanol and 8,974 g methyl nonafluorobutyl ether was prepared in the same manner as above and the solution placed in the autoclave and feed reservoir as above.

The autoclave was heated to 150° C. and catalyst solution feed started at 16.9 g/min once the temperature reached 145° C. At 148° C., TFE feed was initiated at a rate of 1.50 g/min. Simultaneous feeds were continued at these rates for the duration of the run. Temperatures and pressures were maintained as in Example 1. The resulting creamy white dispersion contained 7.1% polymer solids. Conversion of TFE to polymer was 88% of theory. The polymer had a melting point of 257° C. by DSC.

Utility as Lubricants/Release Agents

The products from the above examples were evaluated for their effectiveness as dry film lubricants and mold release agents. Lubricity was determined by measuring the dynamic coefficient of friction on a modified Altek Model 9505A Lubricity Tester. Release performance was also evaluated on the same machine (test method documented in Paper No. 91, presented at a meeting of the Rubber Division, American Chemical Society, May 6–9, 1997, Anaheim, Calif. by Kathleen Shields of the DuPont Company).

Test samples were prepared as follows. The polymer dispersions from the previous examples were diluted to 5% active ingredient with isopropyl alcohol. Two 3"×5" stainless steel plates were coated with the test mixture by either dipping or spraying the mixture onto the plates. The plates were air dried for 30 min, then dried for 10 min at 100° C. The coated plates were then evaluated for coefficient of friction and release performance (using epoxy glue) according to the above method. The new polymers were compared with a chemically similar commercial product called Dry-Film DF/IPA. (This is DryFilm DF which has been exchanged into isopropanol solvent.) The results are summarized in the table below.

TABLE 1

Evaluation of New Polymers

| SAMPLE | COEFFICIENT OF FRICTION | NO. OF RELEASES |
|---|---|---|
| Example 1 | 0.040 | 11 |
| Example 2 | 0.045 | 13 |
| Example 3 | 0.044 | 21 |
| Example 4 | 0.059 | 8 |
| Example 5 | 0.030 | 8 |
| Example 6 | 0.036 | 18 |
| Example 7 | 0.048 | 17 |
| Example 8 | 0.056 | 5 |
| Example 9 | 0.044 | 5 |
| Control DryFilm DF/IPA | 0.057 | 8 |

The results shown in Table 1 demonstrate the improved lubricity and release properties of the fluorotelomers of this invention.

Several samples were evaluated under more representative compression molding conditions. A small bench-top compression mold was thoroughly cleaned. The mold was heated to 90° C. and sprayed one coat on each side with the test sample. The mold was heated to 175° C. for 10 min, given another light coat of sample, and then EPDM rubber parts were molded. The number of parts that was successfully molded is shown below.

TABLE 2

Compression Molding

| SAMPLE | PARTS RELEASED |
|---|---|
| Example 1 | 7 |
| Example 2 | 7 |
| Example 3 | 10 |
| Control DryFilm DF/IPA | 1 |

The results in Table 2 demonstrate the significant improvement in performance afforded by the fluorotelomers of this invention in compression molding.

What is claimed is:

1. A composition comprising a fluorotelomer, which comprises repeat units derived from a fluoroalkene, and optionally a comonomer, and has an end group derived from a hydrofluorocarbon and a secondary alcohol or its ether or its ester wherein said fluorotelomer has the formula of $H(CX_2)_p B_q D_r$ or a mixture of $H(CX_2)_p B_q$ and $H(CX_2)_p D_r$; X is H or F; p is a number from about 36 to about 1500; B represents end group derived from said hydrofluorocarbon; q is a number from 0.02 to 0.4; D represents end group derived from said secondary alcohol or its ether or its ester; and r is a number from 0.2 to 1.0.

2. A composition according to claim 1 wherein said composition is said fluorotelomer.

3. A composition according to claim 2 wherein said fluoroalkene is tetrafluoroethylene, hexafluoropropylene, or combinations thereof.

4. A composition according to claim 2 wherein said fluoroalkene is tetrafluoroethylene.

5. A composition according to claim 2 wherein said secondary alcohol or its ether or its ester has 4 to about 12 carbon atoms and has an α hydrogen.

6. A composition according to claim 5 wherein said composition further comprises repeat units derived from a crosslinking agent.

7. A composition according to claim 2 wherein said secondary alcohol or its ether or its ester is selected from the group consisting of 2-butanol, 2-pentanol, 2-hexanol, 2-heptanol, sec-butyl acetate, cyclohexanol, 1-methoxy-2-propanol, 1-methoxy-3-butanol, 1-methoxy-2-pentanol, 1-methoxy-2-propanol acetate ester, and combinations of two or more thereof.

8. A composition according to claim 2 wherein said secondary alcohol is 2-butanol, 2-pentanol, or combinations thereof.

9. A composition according to claim 4 wherein said secondary alcohol is 2-butanol, 2-pentanol, or combinations thereof.

10. A composition according to claim 2 wherein said crosslinking agent is a tetraalkyl titanate having the formula of $M(OR)_4$; M is titanium or zirconium; and each R is independently an alkyl radical, a cycloalkyl radical, an aralkyl hydrocarbon radical, and combinations of two or more thereof.

11. A composition according to claim 2 wherein said hydrofluorocarbon is 2,3-dihydrodecafluoropentane, (perfluorobutyl) methyl ether, (perfluorobutyl) ethyl ether, 2,4-dihydrooctafluorobutane, 1,1,2,3,3,3-hexafluoropropyl methyl ether, 2-trifluoromethyl-2,3-dihydornonafluoropentane, 1,1,1,3,3-pentafluorobutane, or combinations thereof.

12. A composition according to claim 2 wherein said hydrofluorocarbon is 2,3-dihydrodecafluoropentane.

13. A composition according to claim 8 wherein said hydrofluorocarbon is 2,3-dihydrodecafluoropentane.

14. A composition according to claim 9 wherein said hydrofluorocarbon is 2,3-dihydrodecafluoropentane.

15. A fluorotelomer comprising repeat units derived from tetrafluoroethylene and has an end cap derived from 2,3-dihydrodecafluoropentane and a secondary alcohol or its ether or its ester wherein said fluorotelomer has the formula of $H(CX_2)_pB_qD_r$ or a mixture of $H(CX_2)_pB_q$ and $H(CX_2)_pD_r$; X is H or F; p is a number from about 36 to about 1500; B represents end group derived from said 2,3-dihydrodecafluoropentane; q is a number from 0.02 to 0.4; D represents an end group derived from a secondary alcohol or its ether or its ester; and r is a number from 0.2 to 1.0.

16. A process for producing a fluorotelomer comprising contacting a perfluoroalkene in a hydrofluorocarbon with a free radical initiator and a secondary alcohol, an ether thereof, an ester thereof, and combinations of two or more thereof wherein said secondary alcohol has at least 4 carbon atoms and is substantially soluble in said hydrofluorocarbon, said fluorotelomer has the formula of $H(CX_2)_pB_qD_r$ or a mixture of $H(CX_2)_pB_q$ and $H(CX_2)_pD_r$; X is H or F; p is a number from about 36 to about 1500; B represents end group derived from said hydrofluorocarbon; q is a number from 0.02 to 0.4; D represents end group derived from said secondary alcohol or its ether or its ester; and r is a number from 0.2 to 1.0.

17. A process according to claim 16 wherein said hydrofluorocarbon is selected from the group consisting of 2,3-dihydrodecafluoropentane, perfluorobutyl methyl ether, and combinations thereof.

18. A process according to claim 16 wherein said hydrofluorocarbon is selected from the group consisting of 2,3-dihydrodecafluoropentane.

19. A process according to claim 16 wherein said secondary alcohol is selected from the group consisting of 2-butanol, 2-pentanol, cyclohexanol, 1-methoxy-2-propanol, 1-methoxy-2-propanol acetate ester, and combinations of two or more thereof.

20. A process according to claim 18 wherein said secondary alcohol is 2-butanol.

21. A process according to claim 18 wherein said secondary alcohol is 2-pentanol.

22. A process comprising contacting a substrate with a composition wherein said composition is as recited in claim 1 and said substrate is selected from the group consisting of wood, metal, plastic, rubber, stone, cement, glass, fiber, and combinations of two or more thereof.

* * * * *